United States Patent [19]

Ko et al.

[11] Patent Number: 5,083,197
[45] Date of Patent: Jan. 21, 1992

[54] APPARATUS FOR RESTORING THE CORRECT PHASE RELATION OF THE CHROMA AND LUMINANCE SIGNALS PASSED THROUGH SEPARATE PATHS

[75] Inventors: Jung-Wan Ko, Suwon, Rep. of Korea; Chandrakant B. Patel, Hopewell, N.J.

[73] Assignee: SamSung Electronics Co., Ltd., Kyung Ki-Do, Rep. of Korea

[21] Appl. No.: 531,144

[22] Filed: May 31, 1990

[51] Int. Cl.$^5$ ............................................. H04N 9/89
[52] U.S. Cl. .................................. 358/19; 358/323; 358/326
[58] Field of Search ................... 358/323, 326, 19, 40

[56] References Cited

U.S. PATENT DOCUMENTS

| | | | |
|---|---|---|---|
| 4,001,876 | 1/1977 | Schless et al. | 358/326 |
| 4,590,510 | 5/1986 | Jensen et al. | 358/326 |
| 4,825,299 | 4/1989 | Okada et al. | 358/323 |

FOREIGN PATENT DOCUMENTS 134594  8/1983  Japan ................................. 358/326

Primary Examiner—John W. Shepperd
Attorney, Agent, or Firm—Robert E. Bushnell

[57] ABSTRACT

Apparatus is disclosed for processing the chroma and luminance signals reproduced from a magnetic recording medium. The chroma signal in passing through a separate path from the luminance signal may suffer a phase displacement relative to the phase of the reference luminance signal. Means are provided for connection between the chroma channel and the luminance channel to generate an error signal representing the phase displacement of the chroma signal relative to the reference luminance signal. Additional means are provided to use this phase error signal to restore the phase of the chroma signal to its original phase relative to the reference luminance signal, whereby to insure the accuracy with which the signals modulating the chroma carrier can be demodulated.

14 Claims, 2 Drawing Sheets

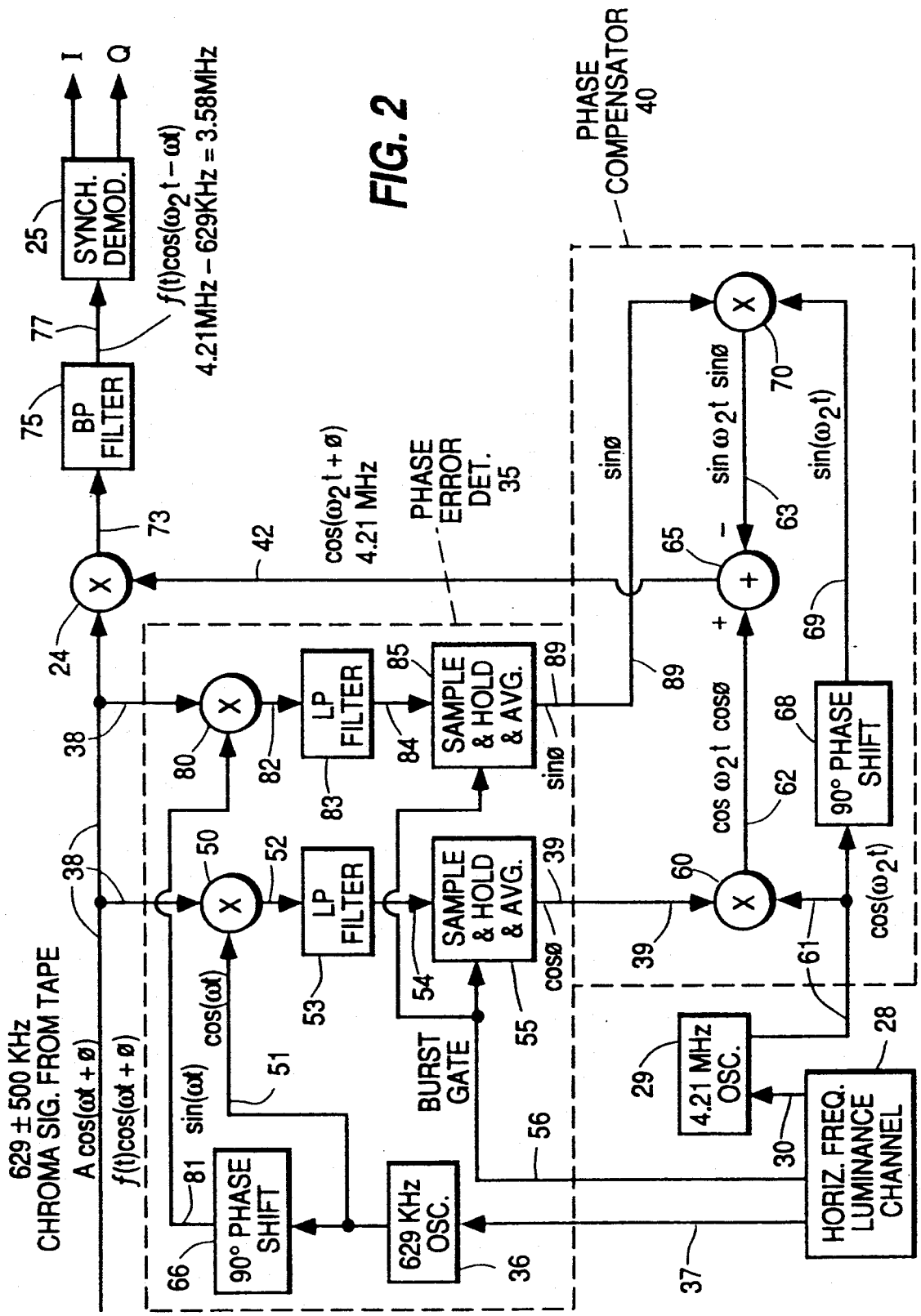

APPARATUS FOR RESTORING THE CORRECT PHASE RELATION OF THE CHROMA AND LUMINANCE SIGNALS PASSED THROUGH SEPARATE PATHS

BACKGROUND OF THE INVENTION

The present invention relates to video signal processing methods and apparatus. More particularly, the invention relates to color video recording and reproducing systems in which the chroma and luminance components of the video signal are separated and passed through separate processing channels, and are later combined to produce a signal for recording on tape, or for reproducing in a television receiver.

The chroma and luminance signals have initial fixed frequency and phase relationships. In passing through separate processing paths, the phase relationship of the chroma signal may become displaced relative to the reference luminance signal. In certain improved video recording and reproducing systems, the phase displacement of the chroma signal relative to the reference luminance signal cannot be tolerated.

It is therefore an object of the invention to detect a phase displacement of a chroma signal relative to a reference luminance signal, and to restore the chroma signal to phase synchronization with the reference luminance signal.

SUMMARY OF THE INVENTION

According to an example of the invention, means are provided to restore the phase of a signal in a chroma channel to the original phase relationship it had with a reference signal in the luminance channel. A first mixer mixes the phase-displaced chroma signal with an oscillation derived from the reference luminance signal to produce a first phase error signal. A second mixer mixes the phase-displaced chroma signal with a 90° phase shifted version of the oscillations to produce a second phase error signal. A third mixer mixes the first phase error signal and a second oscillation at a frequency related to the frequency of the reference luminance signal. A fourth mixer mixes a second phase error signal and a 90° phase shifted version of said second oscillation. An adder receives the outputs of the third and fourth mixers and produces a phase compensation signal for restoring the phase of the chroma signal.

BRIEF DESCRIPTION OF THE DRAWING

FIG. 2 is a more detailed schematic diagram of the video signal reproducing system, the phase error detection circuit, and the phase compensation circuit.

DETAILED DESCRIPTION

Figure 1:
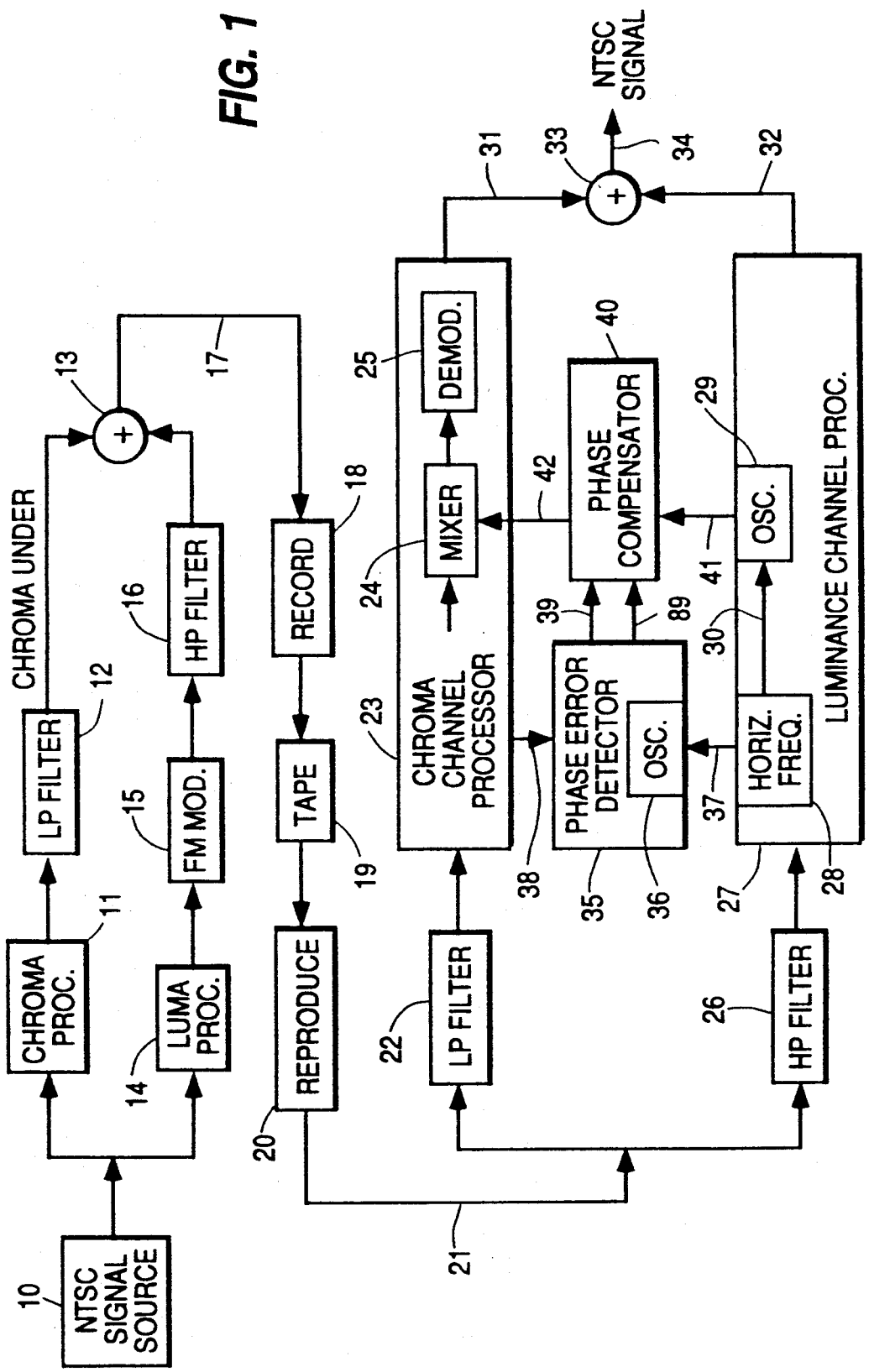
FIG. 1 is a schematic diagram of a video cassette recorder for recording chroma and luminance video signals on a magnetic tape, and for reproducing chroma and luminance signals from the magnetic tape, including means to correct a displacement or error in the phase of the chroma signal relative to the reference luminance signal.

The embodiment described herein is used in a typical video recording system (VHS), but the invention can be applicable in any circumstance where the phase displacement is found between the two signals. FIG. 1 refers to a typical VCR recording/play-back system.

Referring now in greater detail to the drawing, in FIG. 1, an NTSC signal from a source 10 is divided, with the chroma portion of the signal going through a chroma processor 11 and a low-pass filter 12 to an adder 13. The chroma signal applied to the adder 13 may be a "chroma under", sometimes called "color under," signal occupying a frequency range of 629 KHz±500 KHz. 629 KHz is 40$f_h$, where $f_h$ is the horizontal frequency, 15734.26 Hz. The luminance portion of the video signal goes through a path including a luminance processor 14, a frequency modulator 15 and a high-pass filter 16 to the adder 13. The luminance signal applied to the adder 13 may be a frequency-modulated signal varying between ≈1.3 MHz and ≈5 MHz. The output of the adder 13 is applied over line 17 to a tape recording apparatus 18 by which the chroma and luminance signals are recorded on magnetic tape 19.

The chroma and luminance signals are reproduced from the tape 19 by apparatus 20 having an output 21. The chroma and luminance signals at output 21 occupy different frequency ranges and are separated from each other by filters. A low-pass filter 22 passes the chroma signal to a chroma channel including a chroma processor 23 which includes a mixer 24 and a synchronous demodulator 25. The chroma signal from demodulator 25 is processed to enhance performance and is modulated to form a suppressed carrier chroma signal, by suitable means not shown, before being applied over line 31 to adder 33. A high pass filter 26 passes the luminance signal to a luminance channel or processor 27 including a horizontal frequency circuit 28 and oscillator 29 operated under frequency and phase control over line 30 from the horizontal frequency circuit 28. The output 31 of the chroma channel and the output 32 of the luminance channel are added in an adder 33 to produce at 34 an NTSC television signal suitable for application to a television receiver.

A phase error detector circuit 35 includes an oscillator 36 which is under the control over line 37 of the horizontal frequency circuit 28 in the luminance channel 27. The phase error detector circuit 35 receives a phase-displaced chroma signal over line 38 from the chroma channel. Phase error signals are applied over line 39 and line 89 to phase compensator 40, which is also receptive to an oscillation over line 41 from the oscillator 29 in the luminance channel. The output from the phase compensator is applied over line 42 to the mixer 24 in the chroma channel 23.

In the system shown in FIG. 1 for encoding and recording a television signal on magnetic tape, and for reproducing and decoding the television signal from the tape, the chroma and luminance signals follow different separate paths through the chroma channel and through the luminance channel, respectively. The signals may also follow different paths as the result of being recorded on one video cassette recorder and reproduced on another. As a result, the exact phase relationship between the chroma signal and the reference luminance signal which exists in the NTSC signal source 10 may not be retained in the decoder portion 23 and 27 of the system shown in the bottom half of FIG. 1.

In some improved systems, such a phase difference is intolerable. Therefore, according to the invention, the phase error detector 35 compares the chroma signal with an oscillation derived from the luminance channel and produces phase error signals. The phase error signals are applied to the phase compensator 40 which generates a signal, for mixing with the phase-shifted chroma signal in mixer 24, to restore the original phase relation of the chroma signal relative to the reference luminance signal.

Reference is now made to FIG. 2 for a more detailed description of the phase error detector 35 and the phase compensator 40 of FIG. 1. The chroma signal from the magnetic tape appearing on line 38 is a "chroma under" signal consisting of a 629 KHz carrier amplitude modulated ±500 KHz. The signal consists of successive horizontal lines of video information separated by synchronizing bursts, the line repetition rate being 15,734.26 Hz in the American NTSC system. The burst signal may be represented as $A \cos(\omega t + \phi)$, where $\phi$ is the phase displacement of the burst signal relative to the reference luminance signal, and $\omega = 2\pi(40f_h)$. The chroma under signal between the bursts may be represented as $f(t) \cos(\omega t + \phi)$, which includes the same phase error $\phi$ as the bursts, but also includes color information phase changes making it unsuitable for use in detecting the phase error $\phi$. The burst signal, $A \cos(\omega t + \phi)$, is used for detecting the phase error.

The phase error detector 35 includes a mixer 50 receptive to the chroma signal on line 38 and to the output of the 629 KHz oscillator 36 on line 51, which may be represented as $\cos(\omega t)$. Oscillator 36 is maintained in frequency and phase synchronization with respect to the luminance horizontal frequency via a signal over line 37 from the horizontal frequency circuit 28 in the luminance channel. The output at 52 from the mixer 50 is applied through a low-pass filter 53 and through a sample-and-hold-and-average circuit 55. The sample-and-hold-and-average circuit operates under control of a burst gate over line 56 from the horizontal frequency circuit 28 in the luminance channel. Thus, the phase error output on line 39 is derived from the burst portion, $A \cos(\omega t + \phi)$, of the chroma under signal received on line 38.

The output of the whole circuit 55 at 39 is a first phase error signal which may be represented as $\cos \phi$. This results from the trigonometric function: $\cos(A) \cos(B) = \cos(A+B) + \cos(A-B)$. Substituting, $\cos(\omega t + \phi) \cos(\omega t) = \cos(\omega t + \phi + \omega t) + \cos(\omega t + \phi - \omega t)$. The low-pass filter 53 passes the second term only, which is equal to $\cos \phi$, and is related to the phase error $\phi$ in the chroma signal relative to the reference signal in the luminance channel.

The phase error detector 35 also includes a mixer 80 receptive to the phase-displaced chroma signal on line 38, and to an output of the 629 KHz oscillator 36 which is 90° phase shifted by phase shifter 66. The output on line 81 from the phase shifter may be represented as $\sin(\omega t)$. The output on line 82 from the mixer 80 is applied through a low-pass filter 83 and through a sample-and-hold-and-average circuit 85, which is also under control over line 56 of the burst gate. Thus, the second phase error output on line 89 is also derived from the burst portion, $A \cos(\omega t + \phi)$, of the chroma under signal received on line 38. This second phase error signal may be represented as $\sin(\phi)$, and it results from trigonometric functions similar to those described above. The low-pass filter 83 passes the $\sin(\phi)$ term only, which is related to the phase error, $\phi$, in the chroma signal.

The phase error signal $\cos \phi$ on line 39 is applied to a mixer 60 in the phase comparator 40. The mixer also receives over line 61 the 4.21 MHz oscillation from oscillator 29, which is under the control of the horizontal frequency circuit 28 in the luminance channel. The oscillation may be represented as $\cos(\omega_2 t)$ where $\omega_2$ corresponds with 4.21 MHz. The output of the mixer 60 on line 62 is the product of two inputs, or, $\cos(\omega_2 t) \cos(\phi)$, and it is applied to the + input of an adder 65.

The $\sin \phi$ output on 89 of the sample-and-hold-and-average circuit 85 is applied as one input to a fourth mixer 70. The $\cos(\omega_2 t)$ output 61 of oscillator 29 is also applied through a 90° phase shift circuit 68 as $\sin(\omega_2 t)$ of the mixer 70 and is applied over line 63 to the —input of adder 65. The output of adder 65 on line 42 is a phase compensation signal which may be represented as $\cos(\omega_2 t + \phi)$. This results from the trigonometric function: $\sin(A) \sin(B) + \cos(A) \cos(B) = \cos(A+B)$. Substituting: $\sin(\omega_2 t)\sin(\phi) + \cos(\omega_2 t)\cos(\phi) = \cos(\omega_2 t + \phi)$.

The phase compensation signal on line 42 is applied to a fifth mixer 24, as is the phase-displaced chroma signal on line 38. The phase compensation signal is $\cos(\omega_2 t + \phi)$ or 4.21 MHz with a phase error of $\phi$ degrees. The phase-displaced chroma signal is $f(t) \cos(\omega t + \phi)$ and is a chroma signal modulated on a 629 KHz carrier with a phase error of $\phi$ degrees. These two signals applied to a fifth mixer 24 produce an output at 73 which is equal to $\cos(\omega_2 t + \omega t + 2\phi) + \cos(\omega_2 t + \phi - \omega t - \phi)$, where the last term simplifies to $\cos(\omega_2 t - \omega t)$. This last term is passed by the bandpass filter 75 to the exclusion of the first term.

Therefore, the last term applied over line 77 to the synchronous demodulator 25 is $\cos(\omega_2 t - \omega t)$ or a 4.21 MHz signal less a chroma signal modulated on a 629 KHz carrier, and is equal to a chroma signal modulated on a 3.58 MHz color subcarrier. This chroma signal is free of the phase displacement of the input chroma signal on line 38. The chroma signal applied to the synchronous demodulator 25 is thus in the same exact phase relation to the signals in the reference luminance channel as it was in the original NTSC source 10 in FIG. 1 before passing through separate channels with different time delays. It is therefore clear that, according to the invention, the synchronous demodulator 25 can demodulate the input signal to produce outputs at precisely accurate phase angles I and Q of the color subcarrier.

What is claimed is:

1. In a system wherein two frequency-related signals A and B follow separate paths to an output point where signal A may be displaced in phase from reference signal B, means at the output point, comprising, a first mixer to mix the phase-displaced signal A with a first oscillation derived from reference signal B to produce a first phase error signal at the frequency of signal A, a second mixer to mix the phase-displaced signal A with a 90° phase shifted version of said first oscillation to produce a second phase error signal, a third mixer to mix said first phase error signal and a second oscillation at a frequency related to the frequency of reference signal B, a fourth mixer to mix said second phase error signal and a 90° phase shifted version of said second oscillation, and an adder receptive to the outputs of said third and fourth mixers to produce a phase compensation signal having a frequency related to the frequency of reference signal B and the phase displacement of signal A.

2. A system as defined in claim 1, and in addition, a fifth mixer receptive to said phase compensation signal and said phase-displaced signal A to produce a signal C which contains the information of signal A without the phase displacement relative to reference signal B.

3. A system as defined in claim 2 wherein said system is a video system in which signal A is a chroma signal in a chroma channel and signal B is a luminance signal in a luminance channel.

4. A system as defined in claim 3, and in addition, low-pass filters between the outputs of said first and second mixers and the inputs of said third and fourth mixers, respectively.

5. A system as defined in claim 4, and in addition, sample-and-hold-and-average circuits in the paths between the source of said phase-displaced chroma signal A and said third and fourth mixers, respectively.

6. A system as defined in claim 5, and in addition, a source of a burst gate in said luminance channel coupled to said sample-and-hold circuits.

7. A system as defined in claim 6, and in addition, a band-pass filter at the output of said fifth mixer to pass said signal C.

8. A system as defined in claim 7, and in addition, a synchronous demodulator receptive to the output of said band-pass filter to produce I and Q color signals.

9. In a video system in which the chroma signal in the chroma channel may be out of phase with the horizontal frequency in the luminance channel, means to restore an in-phase relation between the signals in the chroma and luminance channels, comprising,
   a first oscillator producing a signal at frequency f1 in the chroma frequency band under control of and in phase with the horizontal frequency in the luminance channel,
   a first mixer mixing said phase-displaced chroma signal and the output of said first oscillator,
   a first low-pass filter receptive to the output of said first mixer to pass a first phase error signal at frequency f1 having the phase of said phase-displaced chroma signal,
   a second mixer receptive to said phase-displaced chroma signal and to 90° phase displaced version of the output of said first oscillator,
   a second low-pass filter receptive to the output of said second mixer to pass a second phase error signal,
   a second oscillator producing a signal at a frequency f2 under control of and in phase with said horizontal frequency in the luminance channel.
   a third mixer receptive to the first phase error signal output of said first low-pass filter and the output of said second oscillator,
   a fourth mixer receptive to said second phase error signal output of said second low-pass filter and a 90° phase shifted output of said second oscillator, and
   an adder receptive to the outputs of said third and fourth mixers and producing a phase compensation signal at frequency f2 with the phase displacement of said phase-displaced chroma signal.

10. A video system as defined in claim 9, and in addition, sample-and-hold-and-average circuits in the paths between the source of said phase-displaced chroma signal and said third and fourth mixers, respectively.

11. A video system as defined in claim 10, and in addition, a source of a burst gate in said luminance channel coupled to said sample-and-hold-and-average circuits.

12. A video system as defined in claim 11, and in addition, a fifth mixer receptive to said phase-displaced chroma signal and the phase compensation output of said adder.

13. A video system as defined in claim 12, and in addition, a band-pass filter receptive to the output of said fifth mixer to produce a chroma signal having a restored in-phase relation with signals in said luminance channel.

14. A video system as defined in claim 13, and in addition, a synchronous demodulator receptive to the output of said band-pass filter to produce I and Q output color signals.

* * * * *